(12) United States Patent
Tadata

(10) Patent No.: US 11,905,094 B2
(45) Date of Patent: Feb. 20, 2024

(54) EXPLOSION-PROOF STRUCTURE

(71) Applicant: YOKOGAWA ELECTRIC CORPORATION, Tokyo (JP)

(72) Inventor: Norihiko Tadata, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 51 days.

(21) Appl. No.: 17/651,144

(22) Filed: Feb. 15, 2022

(65) Prior Publication Data

US 2022/0289452 A1 Sep. 15, 2022

(30) Foreign Application Priority Data

Mar. 11, 2021 (JP) .................................. 2021-039702

(51) Int. Cl.
*B65D 77/22* (2006.01)
(52) U.S. Cl.
CPC .................................. *B65D 77/225* (2013.01)
(58) Field of Classification Search
CPC ...... B65D 77/225; F16B 33/004; F16B 37/14; F16B 5/02; H05K 5/061; H05K 5/0008; H05K 7/14
See application file for complete search history.

(56) References Cited

U.S. PATENT DOCUMENTS

2022/0336912 A1* 10/2022 Morii .................. H01M 50/308

FOREIGN PATENT DOCUMENTS

| CN | 209949663 U | 1/2020 |
|---|---|---|
| DE | 102013113158 A1 | 5/2015 |
| DE | 102017211848 A1 | 1/2019 |
| JP | 60-31130 U | 3/1985 |
| JP | 62-35946 U | 3/1987 |
| JP | 4-103048 U | 9/1992 |
| JP | 3007520 U | 2/1995 |
| JP | 11-87941 A | 3/1999 |
| JP | 2005-180878 A | 7/2005 |
| JP | 2013-64499 A | 4/2013 |
| JP | 2014-130714 A | 7/2014 |
| JP | 2019-127057 A | 8/2019 |

* cited by examiner

*Primary Examiner* — Shawn M Braden
(74) *Attorney, Agent, or Firm* — RANKIN, HILL & CLARK LLP

(57) ABSTRACT

An explosion-proof structure is formed by a fastener, two internal space-forming members joined together to form an internal space by the fastener being inserted into an insertion hole and fastened to a fastening hole, and a plug attached to the insertion hole so as to cover the head of the fastener.

3 Claims, 5 Drawing Sheets

EXPLOSION-PROOF STRUCTURE

CROSS-REFERENCE TO RELATED APPLICATION

The present application claims priority to and the benefit of Japanese Patent Application No. 2021-039702 filed Mar. 11, 2021, the entire contents of which are incorporated herein by reference.

TECHNICAL FIELD

The present disclosure relates to an explosion-proof structure.

BACKGROUND

An explosion-proof structure formed by a fastener and two internal space-forming members, which are joined together to form an internal space by the fastener being inserted into an insertion hole and fastened to a fastening hole, is known. For example, see Patent Literature (PTL) 1.

CITATION LIST

Patent Literature

PTL 1: JP 2014-130714 A

SUMMARY

An explosion-proof structure according to an embodiment is formed by a fastener, two internal space-forming members joined together to form an internal space by the fastener being inserted into an insertion hole and fastened to a fastening hole, and a plug attached to the insertion hole so as to cover a head of the fastener.

DETAILED DESCRIPTION

The above-described explosion-proof structure is difficult to reduce in size, for example since flanges with insertion holes and fastening holes may need to be provided.

An explosion-proof structure according to an embodiment is formed by a fastener, two internal space-forming members joined together to form an internal space by the fastener being inserted into an insertion hole and fastened to a fastening hole, and a plug attached to the insertion hole so as to cover a head of the fastener. According to this configuration, even when sufficient performance as an explosion-proof structure cannot be achieved simply by fastening the fastener, sufficient performance as an explosion-proof structure can be achieved by further attaching the plug to the insertion hole. The plug can therefore increase the degree of freedom in the arrangement of fasteners, making it easier to achieve a reduction in size of the explosion-proof structure.

In an embodiment, the plug in the explosion-proof structure includes a recess to accommodate the head. According to this configuration, the depth of the insertion hole can be reduced, making it even easier to achieve a reduction in size of the explosion-proof structure.

In an embodiment, the plug in the explosion-proof structure includes a male thread that screws into the insertion hole. According to this configuration, the degree of freedom in the arrangement of fasteners can be further increased, making it even easier to achieve a reduction in size of the explosion-proof structure.

In an embodiment, the fastener in the explosion-proof structure is configured as a bolt. According to this configuration, fastening can be achieved with a simple structure.

In an embodiment, the fastening hole in the explosion-proof structure is configured as a screw hole. According to this configuration, fastening can be achieved with a simple structure.

According to the present disclosure, it is possible to provide an explosion-proof structure that can easily be reduced in size.

Embodiments of the present disclosure are described below with reference to the drawings.

Figure 1:
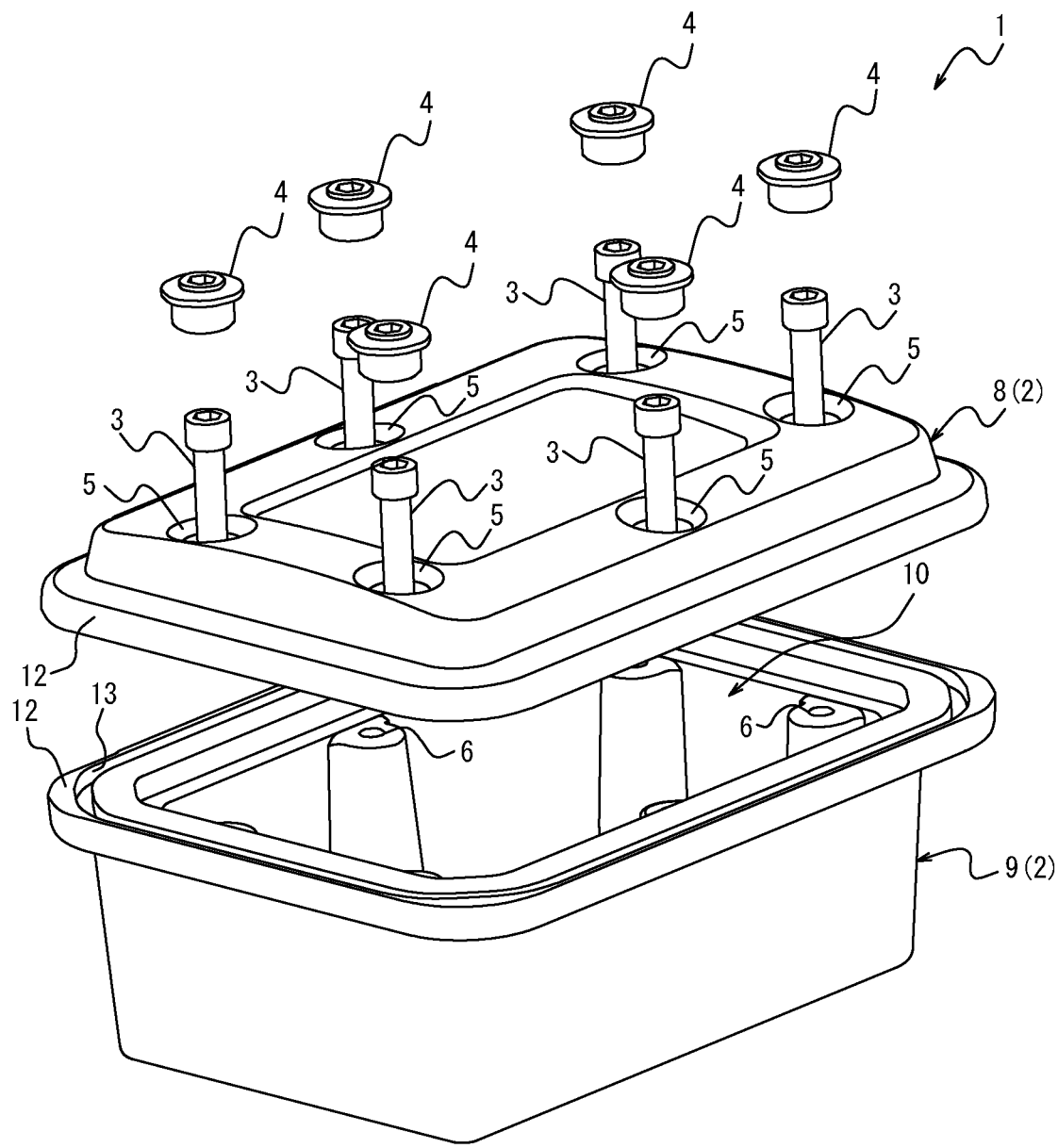
FIG. 1 is an exploded perspective view of an explosion-proof structure according to a first embodiment.
Figure 2:
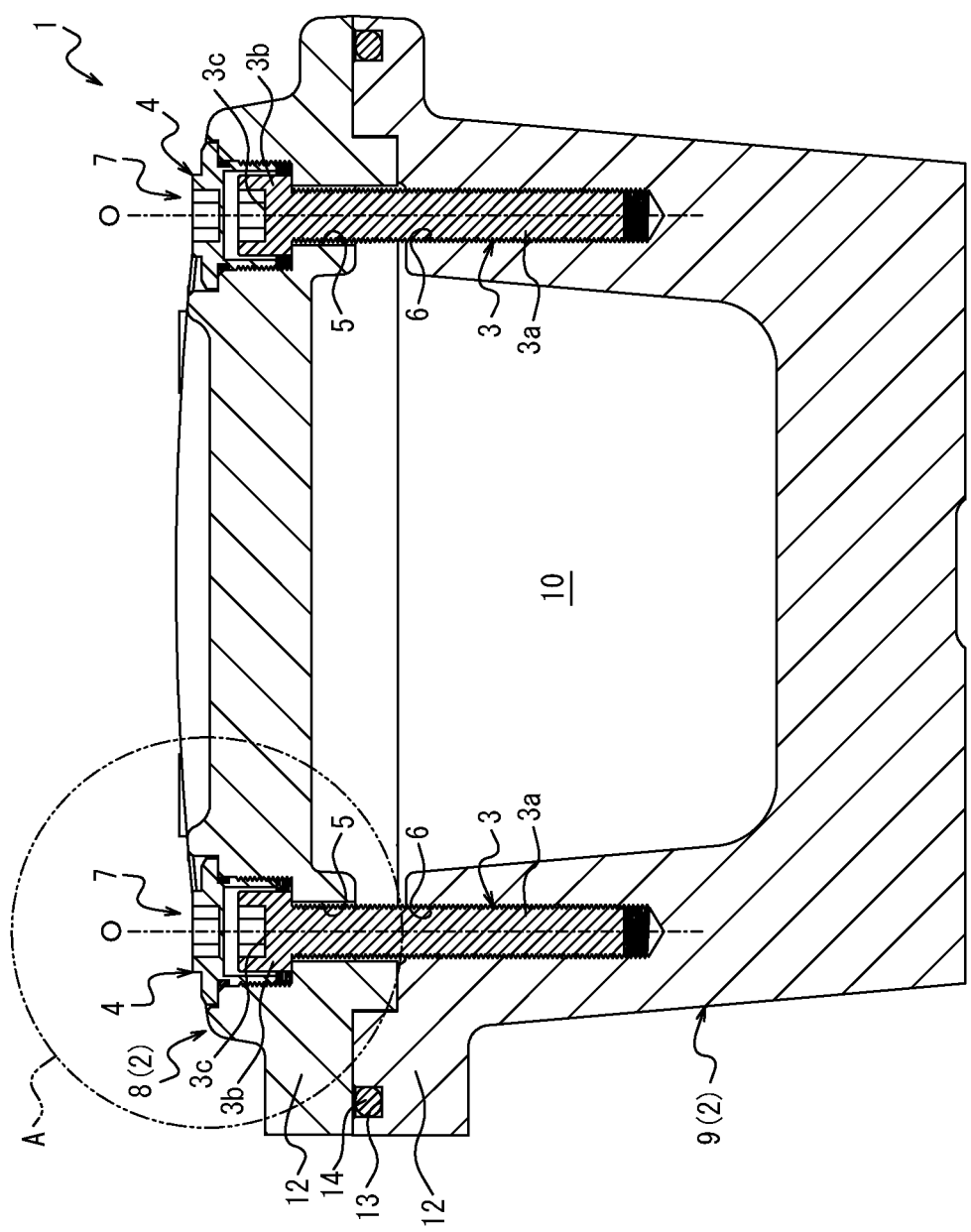
FIG. 2 is a cross-sectional view of the explosion-proof structure illustrated in FIG. 1.
Figure 3:
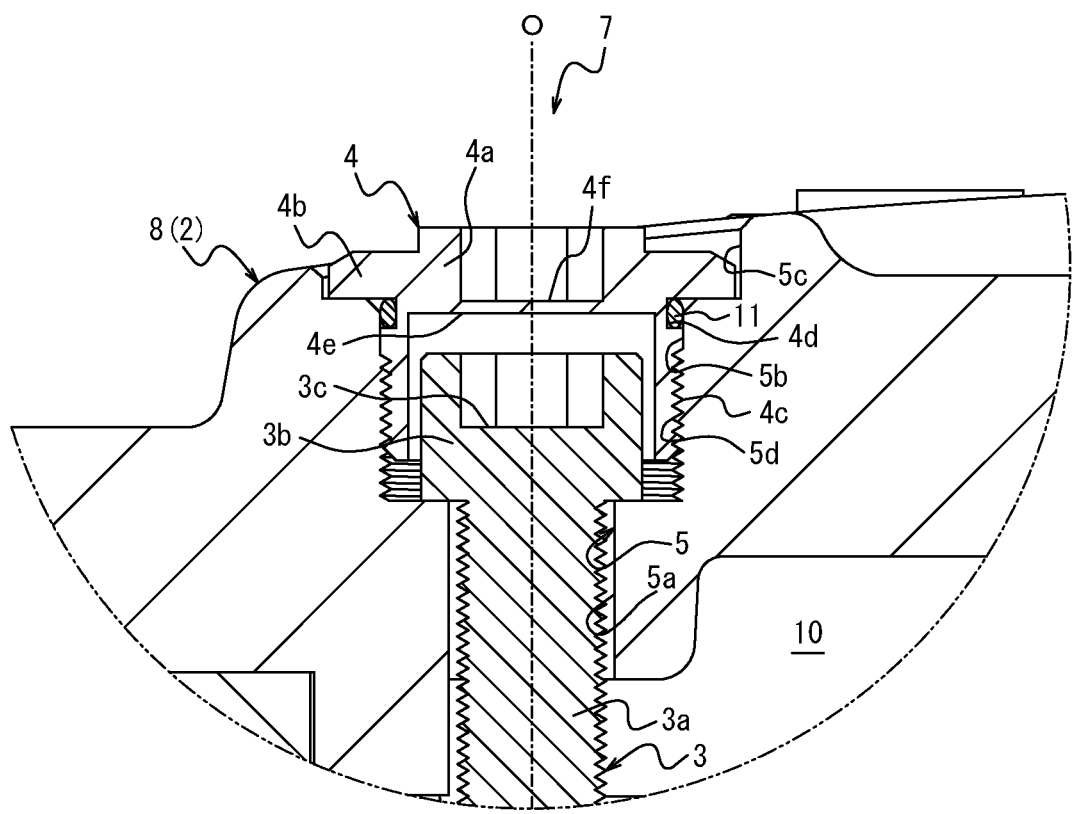
FIG. 3 is an enlarged view of part A of FIG. 2.

As illustrated in FIGS. 1 to 3, the explosion-proof structure 1 according to the first embodiment is formed by two internal space-forming members 2 and one or more (six in the present embodiment) pairs of a fastener 3 and a plug 4. The two internal space-forming members 2 include one or more (six in the present embodiment) pairs of an insertion hole 5 and a fastening hole 6, corresponding in number to the fasteners 3 and plugs 4. In other words, the explosion-proof structure 1 includes one or more (six in the present embodiment) fastening portions 7, each formed by a fastener 3, a plug 4, an insertion hole 5, and a fastening hole 6. All of the fastening portions 7 have the same structure and orientation. The two internal space-forming members 2, the fasteners 3, and the plugs 4 are each made of metal, for example.

The explosion-proof structure 1 according to the present embodiment is the structure of an explosion-proof container for a converter that forms a sensor device as a field device used in a plant. The explosion-proof structure 1 may, however, be the structure of a container for field devices other than such a converter.

Field devices refer to sensor devices such as pressure gauges, flow meters, and temperature sensors; valve devices, such as flow control valves and opening/closing valves; actuator devices, such as fans or motors; image capturing devices, such as cameras and video recorders, that capture images of the conditions and objects in the plant; acoustic devices, such as microphones that collect abnormal noises and the like inside the plant and speakers that emit warning sounds or the like; position detectors that output positional information for various devices; and other such devices. The plant is an industrial plant such as a chemical plant; a plant for managing a well site, such as a gas field or oil field, and the surrounding area; a plant for managing power generation such as hydroelectric power, thermal power, nuclear power, or the like; a plant for managing environmental power generation such as solar power, wind power, or the like; a plant for managing water and sewage, a dam, or the like; or another type of plant.

The two internal space-forming members 2 are joined together to form an internal space 10 by each fastener 3 being inserted into an insertion hole 5, provided in correspondence with the fastener 3 in one internal space-forming member 2 (hereinafter also referred to as a first member 8), and fastened to a fastening hole 6, provided in correspondence with the fastener 3 in the other internal space-forming member 2 (hereinafter also referred to as a second member 9). In the present embodiment, the first member 8 is a lid, and the second member 9 is a housing, but this example is not limiting. The first member 8 may be a housing, and the second member 9 may be a lid.

The fastener 3 includes a shaft 3a that is fastened to the fastening hole 6 and a head 3b that is larger in diameter than the shaft 3a. The head 3b includes an operable part (hereinafter referred to as a first operable part 3c), configured by a non-circular hole formed on the upper surface, to receive a rotational operation for fastening. The fastener 3 is configured as a bolt, with the shaft 3a being a threaded shaft, and the fastening hole 6 is configured as a threaded hole.

In the present embodiment, the up-down direction refers to the direction along the central axis O of the shaft 3a of the fastener 3 (e.g., the up-down direction in FIG. 2), the radial direction refers to the direction along a straight line orthogonal to the central axis O, and the circumferential direction refers to the direction around the central axis O.

The plug 4 is attached to the insertion hole 5 so as to cover the head 3b of the fastener 3. The plug 4 includes a plug body 4a that covers the head 3b of the fastener 3 and an eave 4b that protrudes radially outward from the upper end of the plug body 4a and extends annularly in the circumferential direction. The portion of the outer circumferential surface of the plug body 4a other than the upper end includes a male thread 4c. The upper end of the outer circumferential surface of the plug body 4a includes a circumferential groove 4d extending annularly in the circumferential direction. An annular elastic sealing member (hereinafter referred to as a first sealing member 11) is provided across the entire circumference of the circumferential groove 4d. The lower surface of the plug body 4a includes a recess 4e to accommodate the head 3b. The upper surface of the plug body 4a includes an operable part (hereinafter referred to as a second operable part 4f), configured by a non-circular hole, to receive a rotational operation for fastening. The second operable part 4f has the same structure as the first operable part 3c.

The insertion hole 5 is a through-hole. The insertion hole 5 includes a first hole 5a that has an inner diameter smaller than the outer diameter of the head 3b and equal to or greater than the outer diameter of the shaft 3a, a second hole 5b that is connected to the upper end of the first hole 5a and has an inner diameter larger than the outer diameter of the head 3b, and a third hole 5c that is connected to the upper end of the second hole 5b and has an inner diameter equal to or greater than the outer diameter of the eave 4b.

The inner circumferential surface of the first hole 5a is a flat cylindrical surface. The bottom surface of the second hole 5b abuts against the bottom surface of the head 3b. At least a portion of the inner circumferential surface of the second hole 5b other than the upper end includes a female thread 5d into which the male thread 4c is screwed. The upper end of the inner circumferential surface of the second hole 5b is in close contact with the sealing member across the entire circumference thereof. The bottom surface of the third hole 5c abuts against the bottom surface of the eave 4b.

The two internal space-forming members 2 include two joints 12 that are joined together by each fastener 3 being inserted into the insertion hole 5 corresponding to the fastener 3, and fastened to the fastening hole 6 corresponding to the fastener 3, and that form a ring extending along the outer periphery of the internal space 10. One of the joints 12 includes a recessed groove 13, on the joint surface, that forms a ring extending along the outer periphery of the internal space 10. An annular elastic sealing member (hereinafter referred to as a second sealing member 14) is provided across the entire circumference of the recessed groove 13. The second sealing member 14 is not illustrated in FIG. 1, but only in FIG. 2. The second sealing member 14 is in close contact with the other joint 12 across the entire circumference thereof. Although the second member 9 includes the recessed groove 13 in the present embodiment, this example is not limiting, and the first member 8 may be configured to include the recessed groove 13.

The first sealing member 11 and the second sealing member 14 can each be provided for waterproofing, dustproofing, or the like. As long as explosion-proof performance can be ensured, a configuration without the first sealing member 11 (and peripheral groove 4d) and the second sealing member 14 (and recessed groove 13) may be adopted.

The second member 9 includes the fastening holes 6 on the internal space 10 side of the annular joint 12. In other words, the fastening portions 7 are located on the internal space 10 side of the two joints 12. The insertion holes 5 communicate with the internal space 10.

According to the present embodiment, even when sufficient performance as the explosion-proof structure 1 cannot be achieved simply by fastening each fastener 3, sufficient performance as the explosion-proof structure 1 can be achieved by further attaching each plug 4 to the insertion hole 5 corresponding to the plug 4. Therefore, the degree of freedom in arranging one or more fastening portions 7 can be increased. For example, the fastening portions 7 can be arranged on the internal space 10 side of the two joints 12, as in the present embodiment. This makes it easier to achieve a reduction in size of the explosion-proof structure 1. Furthermore, a reduction in size of the explosion-proof structure 1 reduces the number of fastening portions 7, thereby facilitating a reduction in cost.

According to the present embodiment, since the plug 4 includes a recess 4e that accommodates the head 3b, the depth of the insertion hole 5 can be reduced and the thickness of the fastening portion 7 in the up-down direction can be reduced.

According to the present embodiment, good explosion-proof performance by the plug 4 can be achieved, since the plug 4 has a male thread 4c.

Figure 4:
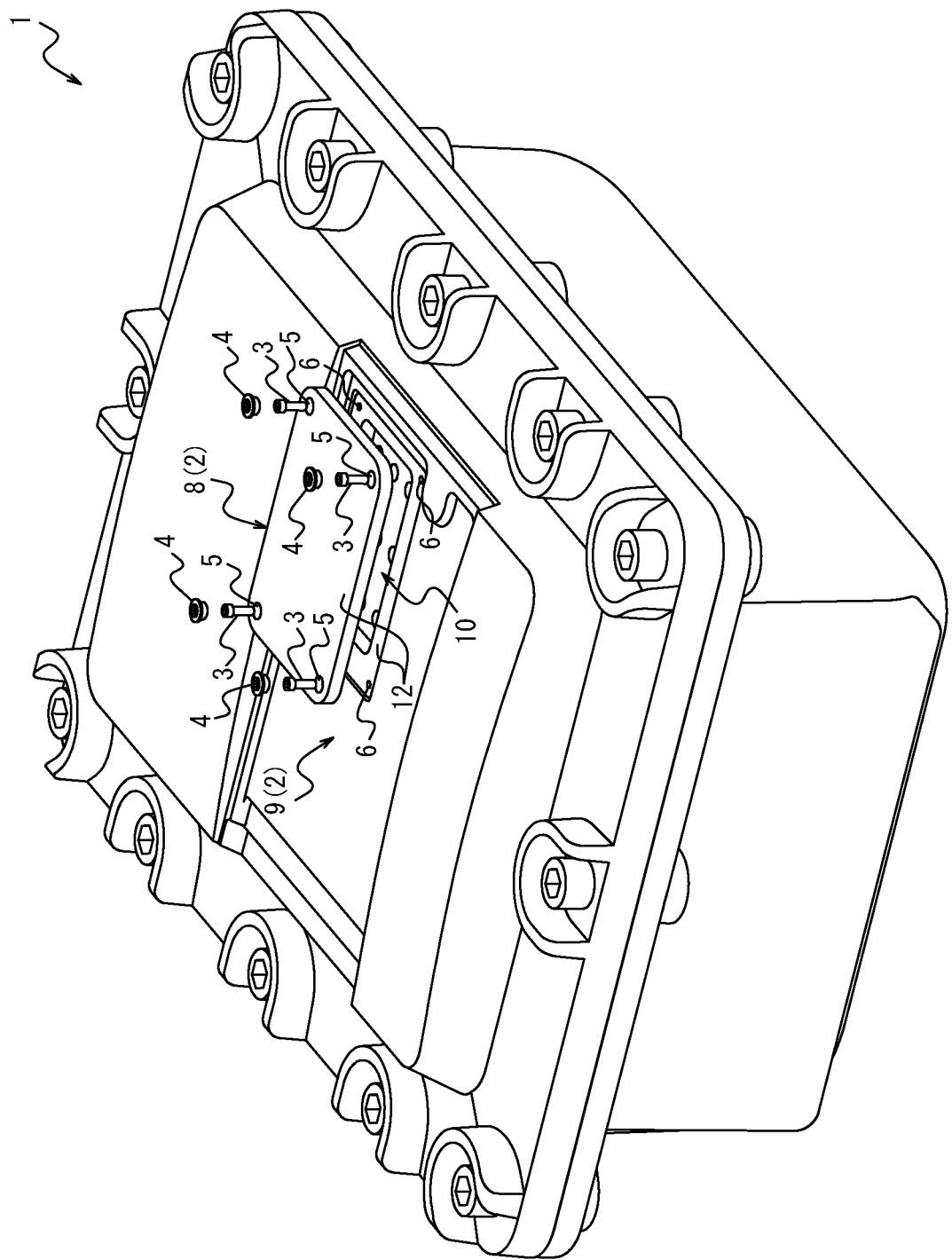
FIG. 4 is an exploded perspective view of an explosion-proof structure according to a second embodiment.
Figure 5:
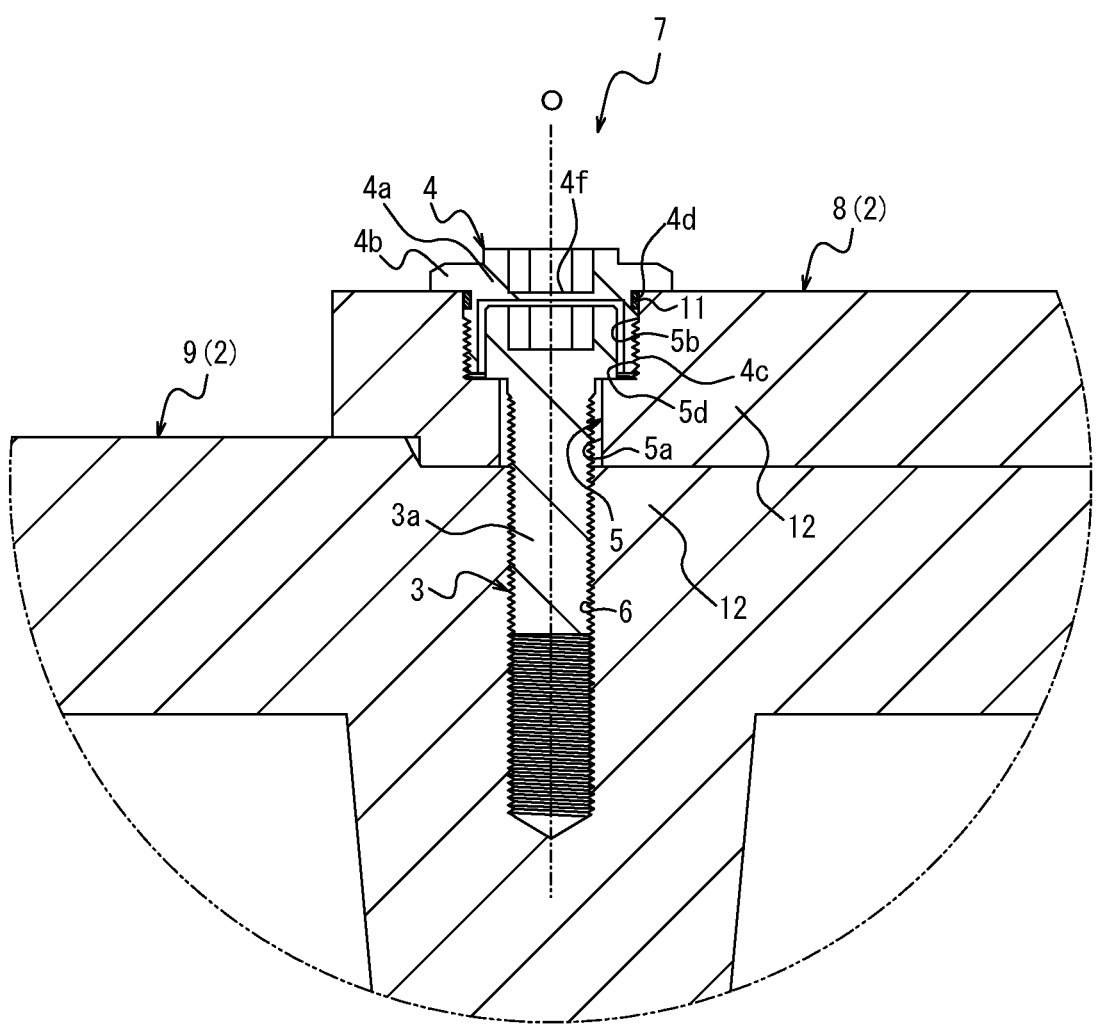
FIG. 5 is a cross-sectional view of the explosion-proof structure illustrated in FIG. 4.

In the first embodiment, the first member 8 is a lid and the second member 9 is a housing. However, the first member 8 may be a window for maintenance work, and the second member 9 may be a lid, as in the second embodiment illustrated in FIGS. 4 to 5. The explosion-proof structure 1 according to the second embodiment is the structure of a window of an explosion-proof container for a converter that forms a sensor device as a field device. The explosion-proof structure 1 may be the structure of a window in a container for field devices other than such a converter.

In the present embodiment, the second member 9 includes the fastening holes 6 in the annular joint 12. In other words, the fastening portions 7 are located in the two joints 12. The insertion holes 5 communicate with the internal space 10 via a non-illustrated gap. In the present embodiment, each insertion hole 5 includes the first hole 5a and the second hole 5b, but does not include the third hole 5c. The remaining configuration is similar to that of the first embodiment.

The same effects as in the first embodiment can be achieved by the present embodiment as well.

The above embodiments are examples of the present disclosure, and a variety of modifications may be made.

For example, the explosion-proof structure 1 according to the above embodiments can be modified in various ways, as described below.

The explosion-proof structure 1 according to the above embodiments can be modified in various ways, as long as the explosion-proof structure 1 is formed by the fastener 3, the two internal space-forming members 2 joined together to form the internal space 10 by the fastener 3 being inserted into the insertion hole 5 and fastened to the fastening hole 6, and the plug 4 attached to the insertion hole 5 so as to cover the head 3b of the fastener 3.

In the explosion-proof structure 1 according to the above embodiments, the plug 4 preferably includes the recess 4e that accommodates the head 3b.

In the explosion-proof structure 1 according to the above embodiments, the plug 4 preferably includes the male thread 4c that screws into the insertion hole 5.

In the explosion-proof structure 1 according to the above embodiments, the fastener 3 is preferably configured as a bolt.

In the explosion-proof structure 1 according to the above embodiments, the fastening hole 6 is preferably configured as a screw hole.

The invention claimed is:

1. An explosion-proof structure formed by:
   plural pairs of a fastener and a plug; and
   two internal space-forming members, joined together to form an internal space, the two internal space-forming members comprising two joints being joined together by each of the fasteners being inserted into an insertion hole corresponding to the fastener and fastened to a fastening hole corresponding to the fastener, the two joints forming a ring extending along an outer periphery of the internal space,
   wherein each of the plugs is attached to the insertion hole in correspondence with the plug so as to cover a head of the fastener, and
   wherein each of the fastening holes is located on an internal space side of the two joints.

2. The explosion-proof structure of claim 1, wherein the plug comprises a recess to accommodate the head.

3. The explosion-proof structure of claim 1, wherein the plug comprises a male thread that screws into the insertion hole.

\* \* \* \* \*